(12) United States Patent
Khan et al.

(10) Patent No.: US 8,613,187 B2
(45) Date of Patent: Dec. 24, 2013

(54) FUEL FLEXIBLE COMBUSTOR SYSTEMS AND METHODS

(75) Inventors: Abdul Rafey Khan, Greenville, SC (US); Willy Steve Ziminsky, Greenville, SC (US)

(73) Assignee: General Electric Company, Schenectady, NY (US)

( * ) Notice: Subject to any disclaimer, the term of this patent is extended or adjusted under 35 U.S.C. 154(b) by 640 days.

(21) Appl. No.: 12/604,435

(22) Filed: Oct. 23, 2009

(65) Prior Publication Data
US 2011/0094234 A1  Apr. 28, 2011

(51) Int. Cl.
*F02C 3/20* (2006.01)

(52) U.S. Cl.
USPC .......................... 60/39.463; 60/734

(58) Field of Classification Search
USPC .......... 60/39.281, 39.463, 737, 746, 733–734
See application file for complete search history.

(56) References Cited

U.S. PATENT DOCUMENTS

| | | | |
|---|---|---|---|
| 3,554,174 A | 1/1971 | Clawson | |
| 3,919,623 A | 11/1975 | Reuther | |
| 4,278,064 A | 7/1981 | Regueiro | |
| 4,761,948 A * | 8/1988 | Sood et al. | 60/39.281 |
| 4,831,818 A | 5/1989 | Martin | |
| 5,067,467 A | 11/1991 | Hill et al. | |
| 5,199,265 A | 4/1993 | Borkowicz | |
| 5,253,478 A * | 10/1993 | Thibault et al. | 60/733 |
| 5,319,936 A * | 6/1994 | Ikeda et al. | 60/737 |
| 5,615,555 A | 4/1997 | Mina | |
| 5,657,632 A | 8/1997 | Foss | |
| 5,865,024 A | 2/1999 | Kress et al. | |
| 5,890,459 A | 4/1999 | Hedrick et al. | |
| 5,992,354 A | 11/1999 | Ahern et al. | |
| 6,009,860 A | 1/2000 | Brown et al. | |
| 6,135,426 A | 10/2000 | Wargolet et al. | |
| 6,149,399 A | 11/2000 | Bowser et al. | |
| 6,235,067 B1 | 5/2001 | Ahern et al. | |
| 6,336,598 B1 | 1/2002 | Touchette et al. | |
| 6,363,724 B1 | 4/2002 | Bechtel et al. | |
| 6,367,239 B1 | 4/2002 | Brown et al. | |
| 6,434,945 B1 | 8/2002 | Mandai et al. | |
| 6,453,673 B1 | 9/2002 | Bechtel et al. | |
| 6,460,326 B2 | 10/2002 | Bechtel et al. | |
| 6,505,644 B2 | 1/2003 | Coha et al. | |
| 6,508,265 B1 | 1/2003 | Bertouille et al. | |
| 6,591,817 B2 | 7/2003 | Deutsch | |
| 6,598,584 B2 | 7/2003 | Beck et al. | |
| 6,722,132 B2 | 4/2004 | Stuttaford et al. | |
| 6,814,032 B2 | 11/2004 | Goto | |
| 6,915,636 B2 | 7/2005 | Stuttaford et al. | |
| 7,089,745 B2 | 8/2006 | Roby et al. | |
| 7,165,405 B2 | 1/2007 | Stuttaford et al. | |
| 7,216,567 B1 | 5/2007 | Nelson | |

(Continued)

OTHER PUBLICATIONS

L.B. Davis, et al., Title: Dry Low NOx COmbustion Systems for GE Heavy-Duty Gas Turbines, GE Power Systems, Dated: Oct. 2000, pp. 1-25.

*Primary Examiner* — Phutthiwat Wongwian
(74) *Attorney, Agent, or Firm* — Sutherland Asbill & Brennan LLP

(57) ABSTRACT

A combustor may include a number of nozzles, a first fuel source with a low reactivity fuel therein, a second fuel source with a high reactivity fuel therein, and a primary valve for varying the flow of the low reactivity fuel and the high reactivity fuel delivered to the nozzles.

20 Claims, 3 Drawing Sheets

(56) References Cited

U.S. PATENT DOCUMENTS

| | | |
|---|---|---|
| 7,353,897 B2 | 4/2008 | Fernandez |
| 7,374,003 B1 | 5/2008 | Fernandez |
| 7,421,999 B2 | 9/2008 | Kim et al. |
| 7,435,503 B2 | 10/2008 | Cohen et al. |
| 2003/0217555 A1* | 11/2003 | Gerhold ........................ 60/776 |
| 2006/0248872 A1* | 11/2006 | Bachovchin et al. ......... 60/39.12 |
| 2007/0234735 A1* | 10/2007 | Mosbacher et al. ............ 60/780 |
| 2008/0083229 A1* | 4/2008 | Haynes et al. .................. 60/776 |
| 2008/0115502 A1 | 5/2008 | Roby et al. |
| 2009/0272118 A1* | 11/2009 | Alexander et al. .............. 60/772 |
| 2010/0024426 A1* | 2/2010 | Varatharajan et al. .......... 60/737 |
| 2010/0095649 A1* | 4/2010 | Blouch et al. ............. 60/39.463 |

\* cited by examiner

FUEL FLEXIBLE COMBUSTOR SYSTEMS AND METHODS

TECHNICAL FIELD

The present application relates generally to gas turbine engines and more particularly relates to fuel flexible combustor systems and methods than can accommodate a range of different types of fuels.

BACKGROUND OF THE INVENTION

Current designs of Dry Low $NO_x$ (DLN) gas turbine engines generally premix the fuel and the air flows upstream of a reaction or a combustion zone. Such premixing tends to reduce combustion temperatures and undesirable emissions such as nitrogen oxides ($NO_x$) and the like. Such emissions are subject to both federal and state regulations in the U.S. and subject to similar regulations abroad.

Current DLN gas turbines generally operate on natural gas although it would be desirable to provide fuel flexibility such that the gas turbine engine also could operate with highly reactive fuels such as syngas and the like. The use of such highly reactive fuels, however, in a premixed nozzle may lead to flame holding and possible nozzle damage. The use of such high reactivity fuels is thus limited.

There is therefore a desire for turbine combustor systems and methods to accommodate a range of fuels from low reactivity fuels such as natural gas to the use of more highly reactive fuels. The combustor should be able to accommodate such highly reactive fuels without limiting durability or efficiency.

SUMMARY OF THE INVENTION

The present application thus provides a combustor. The combustor may include a number of nozzles, a first fuel source with a low reactivity fuel therein, a second fuel source with a high reactivity fuel therein, and a primary valve for varying the flow of the low reactivity fuel and the high reactivity fuel delivered to the nozzles.

The present application further provides a method of operating a combustor with a low reactivity fuel and a high reactivity fuel. The method may include the steps of directing a flow of the low reactivity fuel to a secondary nozzle, directing a flow of the low reactivity fuel to a number of primary nozzles, varying the flow of the low reactivity fuel directed to the secondary nozzle and the primary nozzles, directing a flow of the high reactivity fuel to the primary nozzles, and varying the flow of the low reactivity fuel and the high reactivity fuel directed to the primary nozzles.

The present application further provides a combustor. The combustor may include a number of primary nozzles, a secondary nozzle, a first fuel source with a low reactivity fuel therein, a secondary valve for varying the flow of the low reactivity fuel delivered to the primary nozzles and the secondary nozzle, a second fuel source with a high reactivity fuel therein, and a primary valve for varying the flow of the low reactivity fuel and the high reactivity fuel delivered to the primary nozzles.

These and other features and improvements of the present application will become apparent to one of ordinary skill in the art upon review of the following detailed description when taken in conjunction with the several drawings and the appended claims.

DETAILED DESCRIPTION

Figure 1:
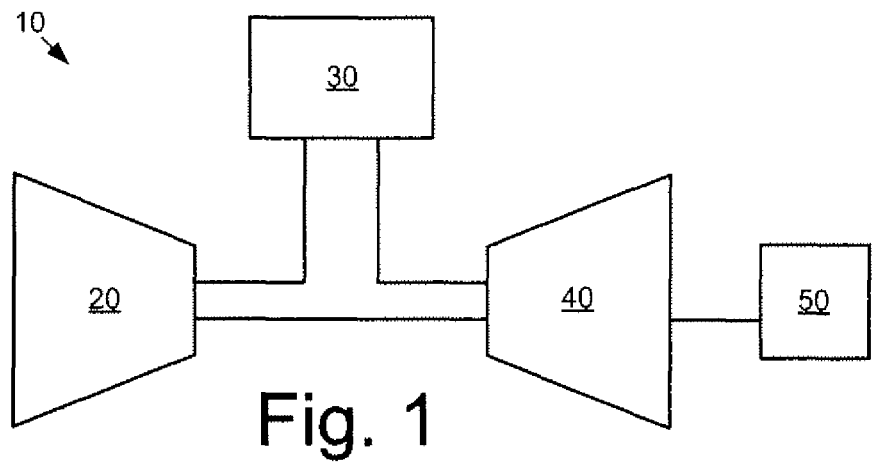
FIG. 1 is a schematic view of a gas turbine engine.

Referring now to the drawings, in which like numerals refer to like elements throughout the several views, FIG. 1 shows a schematic view of a gas turbine engine 10. As is known, the gas turbine engine 10 may include a compressor 20 to compress an incoming flow of air. The compressor 20 delivers the compressed flow of air to a combustor 30. The combustor 30 mixes the compressed flow of air with a compressed flow of fuel and ignites the mixture. Although only a single combustor 30 is shown, the gas turbine engine 10 may have any number of combustors 30. The hot combustion gases are in turn delivered to a turbine 40. The hot combustion gases drive the turbine 40 so as to produce mechanical work. The mechanical work produced in the turbine 40 drives the compressor 20 and an external load 50 such as an electrical generator and the like.

The gas turbine engine 10 may be an F-class heavy duty turbine engine offered by General Electric Company of Schenectady, N.Y., and the like. The gas turbine engine 10 may have other configurations and may use other types of components. Other types of gas turbine engines 10 also may be used herein. Multiple gas turbine engines 10, other types of turbines, and other types of power generation equipment may be used.

Figure 2:
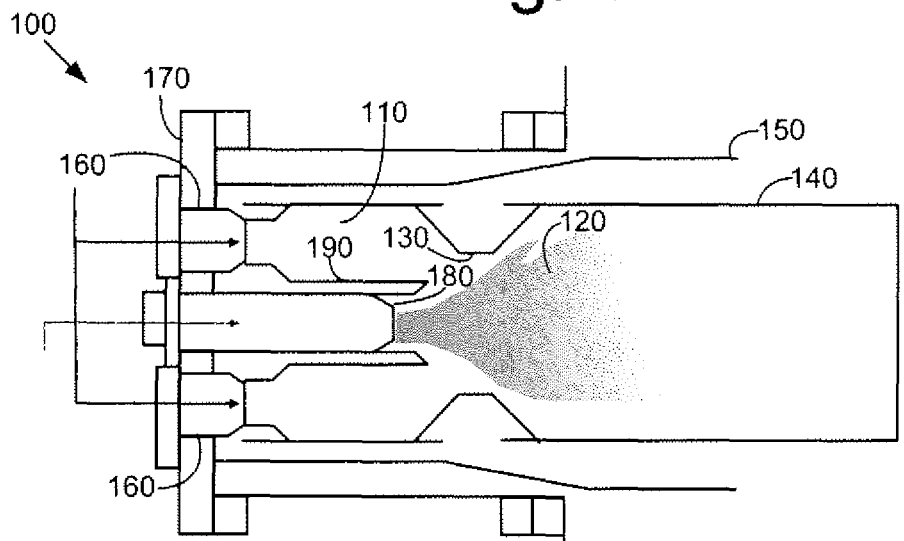
FIG. 2 is a schematic view of a combustor as may be described herein.

FIG. 2 shows one example of a combustor 100 as may be described herein. The combustor 100 may be a DLN-1 combustor offered by General Electric Company of Schenectady, N.Y., and the like. Other types of combustors 100 also may be used herein.

The combustor 100 may include a primary or upstream combustion zone 110 and a secondary or downstream combustion zone 120. The combustion zones 110, 120 may be separated by a venturi 130. The venturi 130 increases the velocity of the combustion gases while reducing the pressures therein generally according to Bernoulli's principle. The combustion zones 110, 120 may be surrounded by a liner 140. The combustor 100 further may include a flow sleeve 150. The flow sleeve 150 may be bolted to the end cover 170. The flow sleeve 150 channels the airflow from the compressor 20. Other combustor designs and configurations may be used herein.

A number of primary nozzles 160 may provide fuel to the primary combustion zone 110. Each of the primary nozzles 160 may protrude into the primary combustion zone 110 and may be mounted about an end cover 170. The primary nozzles 160 may be arranged in an array around a central secondary nozzle 180. The secondary nozzle 180 may extend from the end cover 170 so as to introduce fuel into the secondary combustion zone 120. The secondary nozzle 180 may be located within a center body 190. Fuel may be delivered to the primary nozzles 160 and the secondary nozzle 180 through fuel lines as will be described in more detail below.

Figure 3:
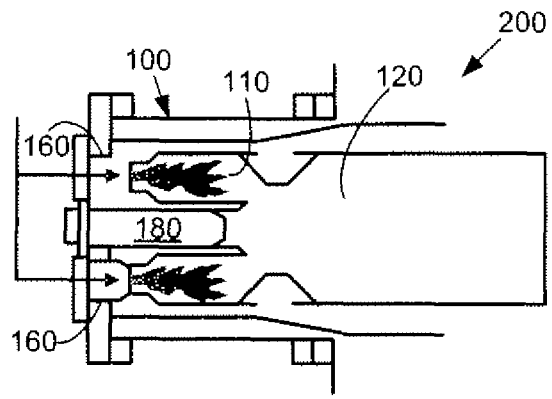
FIG. 3 is a schematic view of the combustor in a primary mode of operation.

The combustor 100 generally operates in four distinct fueling modes. FIG. 3 shows a primary mode 200 of operation. In the primary mode 200, fuel is provided to the primary nozzles 160 only. As such, the combustion flame is only in the primary combustion zone 110. The primary mode 200 is used to ignite, accelerate, and operate over low load to mid-loads and up to a preselected combustion reference temperature. Specifically, the primary mode 200 generally is used from ignition to about twenty percent (20%) of full load or so.

Figure 4:
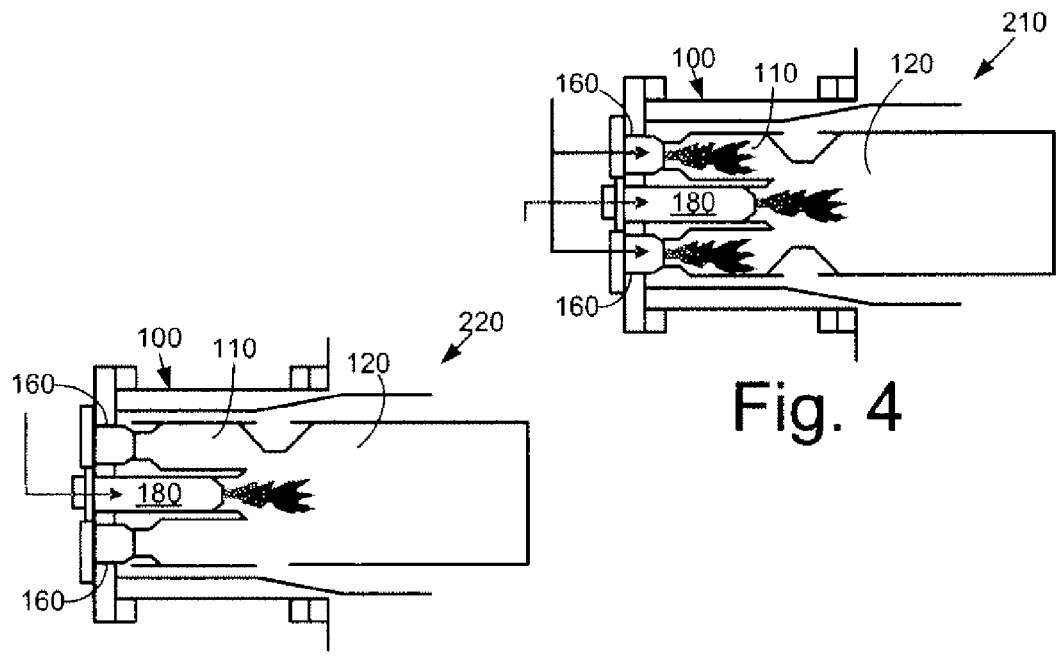
FIG. 4 is a schematic view of the combustor in a lean-lean mode of operation.

FIG. 4 shows a lean-lean mode 210 of operation. In the lean-lean mode 210, fuel is provided to both the primary nozzles 160 and the secondary nozzle 180. The combustion flame thus is in both the primary combustion zone 110 and the secondary combustion zone 110. This mode of operation generally is used for intermediate loads of about twenty percent (20%) to about fifty percent (50%) and in between two preselected combustion referenced temperatures. About seventy percent (70%) of the fuel is directed to the primary nozzles 160 while the remaining thirty percent (30%) is directed towards the secondary nozzle 180.

Figure 5:
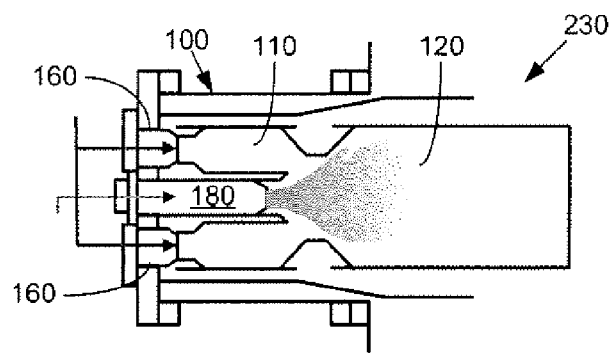
FIG. 5 is a schematic view of the combustor in a transfer mode of operation.

FIG. 5 shows a transfer mode 220 of operation. In the transfer mode 220, fuel is delivered to the secondary nozzle 180 only. As such, the combustion flame is only in the secondary combustion zone 120. This mode is a transition between the lean-lean mode 210 and the premixed mode described below. The transfer mode 220 is necessary to distinguish the flame in the primary combustion zone 110 before fuel is reintroduced into what becomes a primary premixing zone.

Figure 6:
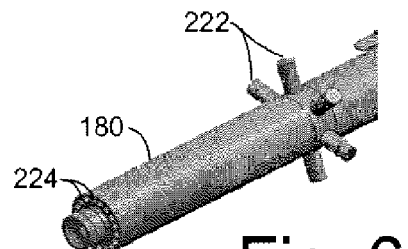
FIG. 6 is a plan view of the end of a secondary nozzle with fuel pegs and transfer passages.

Although fuel is delivered only to the secondary nozzle 180, the secondary nozzle 180 may include multiple fuel passages therein. As is shown in FIG. 6, the secondary nozzle 180 may include a number of fuel pegs 222 for standard secondary nozzle premix operation. The secondary nozzle 180 also may include a number of transfer passages 224 positioned about the end of the nozzle 180. The transfer passages 224 deliver a second flow of fuel from the primary nozzles 160 to the end of the secondary nozzle 180 for diffusion in the transfer mode 220. The transfer passages 224 are positioned at the end of the secondary nozzle 180 such that flame holding should be avoided.

Figure 7:
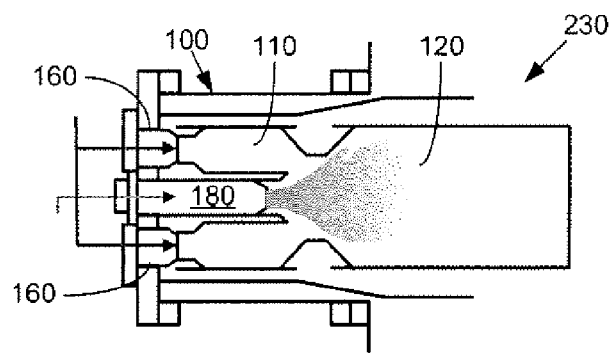
FIG. 7 is a schematic view of the combustor in a premix mode of operation.

FIG. 7 shows a premix mode 230 of operation. In the premix mode 230, fuel is delivered to both the primary nozzles 160 and the secondary nozzle 180. The combustion flame is only in the secondary combustion zone while the fuel and the air flows are premixed in the primary zone 110. The premix mode 230 is achieved at and near the combustion reference temperature design point. Optimum emissions are generated when operating in the premix mode 230. About eighty percent (80%) of the fuel is delivered to the primary nozzles 160 with the remaining twenty percent (20%) or so being delivered to the secondary nozzle 180.

In addition to normal operations, different sequences may be required if primary re-ignition (PRI) is established, i.e., if the combustion flame is present in the primary combustion zone 110 while in the premixed mode 230. In such a situation, fuel flow may be reduced from the primary nozzles 160 until the transfer mode 220 is again established with fuel only being delivered to the secondary nozzle 180. The combustor 100 then may return to the premix mode 230 once the combustion flame is extinguished in the primary combustion zone 110.

Figure 8:
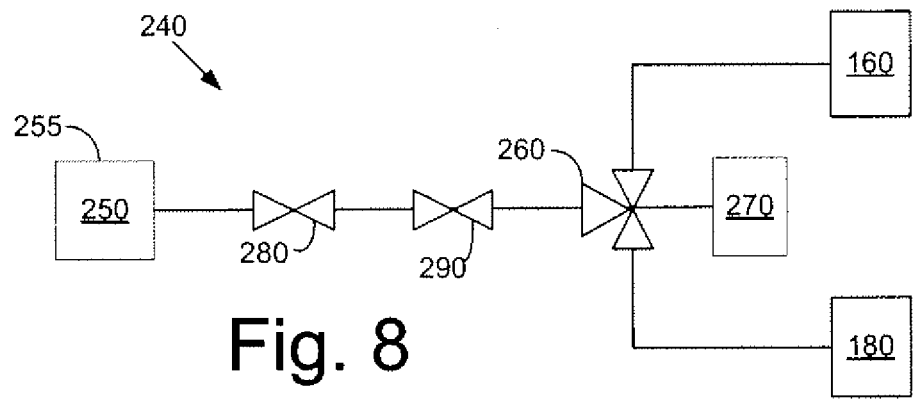
FIG. 8 is a schematic view of a fuel injection system.

FIG. 8 shows a fuel injection system 240 that may be used with the combustor 100. The fuel injection system 240 generally includes a fuel source 250 with a fuel 255 therein. The fuel 255 generally may be natural gas although other types of fuels may be used. The fuel source 250 may be in communication with the primary nozzles 160 and the secondary nozzle 180 via a splitter valve 260. The splitter valve 260 determines the percentage of the fuel 255 that flows to either the primary nozzles 160 and/or the secondary nozzle 180. The splitter valve 260 may be in communication with a control 270. The control 270 may be a conventional microprocessor and the like. The control 270 may use various algorithms to determine the percentage of the fuel 255 to be delivered to the nozzles 160, 180 as well as other fluids based upon an overall turbine load and other factors. A speed ratio valve 280 and a gas control valve 290 also may be used.

Figure 9:
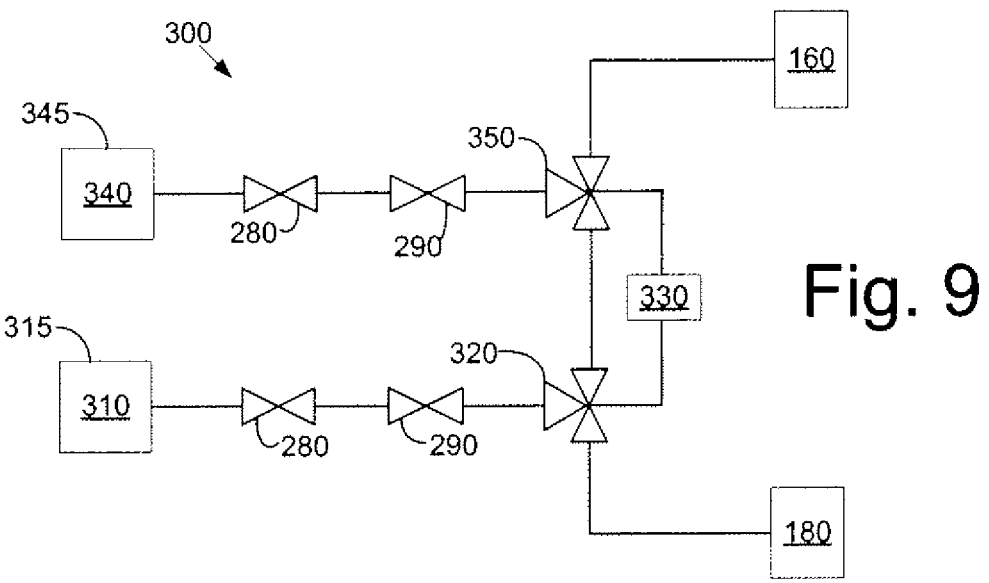
FIG. 9 is a schematic view of a flexible fuel injection system as is described herein.

FIG. 9 shows a flexible flue injection system 300 as may be described herein. The flexible fuel injection system 300 includes a first fuel source 310 with a first fuel 315 therein. The first fuel 315 may be a low reactivity fuel such as natural gas and the like. The first fuel source 310 also may be in communication with the primary nozzles 160 and the secondary nozzle 180. A first fuel splitter valve 320 also may be in communication with a control 330 to direct the flows as is described above.

The flexible fuel injection system 300 further may include a second fuel source 340 with a second fuel 345 therein. The second fuel 345 may be a high reactivity fuel. Examples of such high reactivity fuels 345 include syngas, hydrogen, and heavier hydrocarbons such as ethane, butane, propane, pentane, carbon monoxide, or mixtures thereof. Other types of high reactivity fuel 345 fuels may be used herein. The second fuel source 340 may be in communication with the primary nozzles 160 via a second fuel splitter valve 350. The second fuel splitter valve 350 also may be in communication with the control 330. (The transfer passages 224 of the secondary nozzle 180 are included with the primary nozzles 180 for clarity and simplification.)

The control 330 thus varies the flow of the low reactivity first fuel 315 from the first fuel source 310 to be delivered to either the primary nozzles 160 or the secondary nozzle 180 via the first fuel splitter valve 320 as is described above. The control 330 also varies the flow of the low reactivity first fuel 315 from the first fuel source 310 and the flow of the high reactivity second fuel 345 from the second fuel source 340 to the primary nozzles 160. Because the secondary nozzle 180 generally only operates in a premix mode, the high reactivity second fuel 345 may not be appropriate for use therewith other than via the transfer passages 224.

Figure 10:
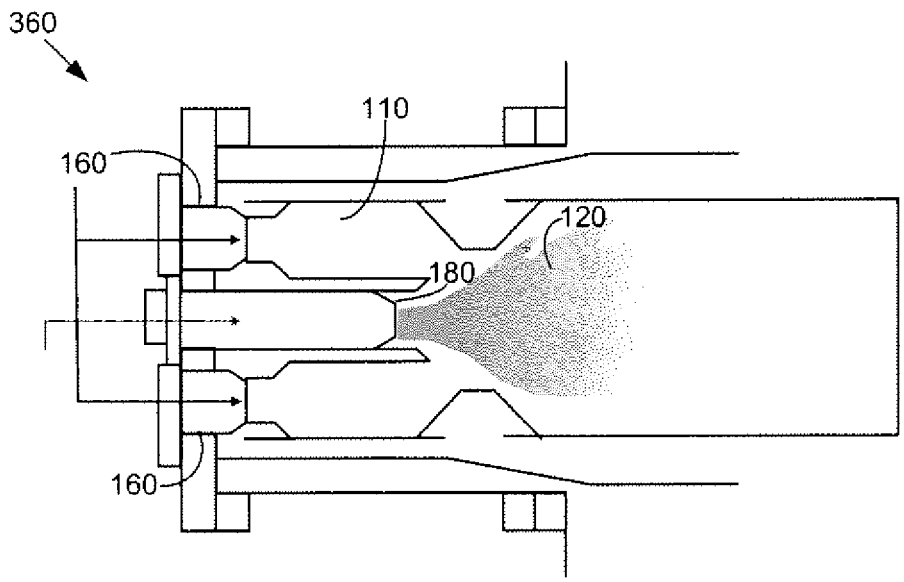
FIG. 10 is a schematic view of the combustor in a blended mode of operation.

In use, natural gas, other types of conventional fuels, natural gas with allowed dopings of reactivity gases, or other types of the low reactivity first fuel 315 may be directed from the first fuel source 310 to the secondary nozzle 180. The low reactivity first fuel 315 and the like generally have good flame holding margins. The first flow splitter 320 apportions the flow of the first fuel 310 between the primary nozzles 160 and the secondary nozzle 180 as is described above. The primary nozzles 160, however, also can operate in a diffusion mode. As such, FIG. 10 shows a blended mode 360 of operation. The second fuel source 340 thus delivers the high reactivity second fuel 345 to the primary nozzles 160. The second flow splitter 350 apportions the flow of the first fuel 315 and the second fuel 345 directed to the primary nozzles 160.

In the primary mode 200 of operation, the secondary nozzle 180 may burn the low reactivity first fuel 315 while the primary nozzles 160 may burn a blend of the low reactivity first fuel 315 and the high reactivity second fuel 345. In the lean-lean mode 210 of operation, the amount of the high reactivity second fuel 345 may be reduced towards the transfer mode 220. In the transfer mode 220, the fuel pegs 222 of the secondary nozzle 180 burn only the low reactivity first fuel 315 while the high reactivity second fuel 345 may be diverted to the transfer passages 224. The blending of the high reactivity second fuel 345 may again begin in the premix mode 230 of operation and continue in the blended mode 360 for stable, efficient operations. The use of the high reactivity second fuel 345 may need to be discontinued during primary re-ignition recovery.

Because the primary nozzles 160 burn about eighty percent (80%) or more of the total fuel volume, the consumption of the high reactivity second fuel 345 may increase without negative impact on hardware. The flexible fuel injection system 300 thus provides fuel flexible over a range of operations.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. A combustor, comprising:
a plurality of nozzles;
a plurality of primary combustion zones;
a secondary combustion zone disposed downstream of the plurality of primary combustion zones;
a first fuel source with a low reactivity gaseous fuel therein;
a second fuel source with a high reactivity gaseous fuel therein; and
a primary splitter valve that splitting the high reactivity gaseous fuel between each of the plurality of nozzles and for varying the flow of the low reactivity gaseous fuel and the high reactivity gaseous fuel delivered to the plurality of nozzles to form a combined flow of gaseous fuel having a reactivity tailored to the plurality of nozzles to prevent flashback/flame holding in the plurality.

2. The combustor of claim 1, wherein the plurality of nozzles comprises a plurality of primary nozzles.

3. The combustor of claim 2, wherein the plurality of nozzles comprises a secondary nozzle and wherein the secondary nozzle is in communication with the first fuel source.

4. The combustor of claim 3, further comprising a secondary valve for varying the flow of the low reactivity gaseous fuel delivered to the plurality of primary nozzles and the secondary nozzle.

5. The combustor of claim 4, further comprising a control in communication with the primary valve and the secondary valve.

6. The combustor of claim 1, wherein the low reactivity gaseous fuel comprises natural gas.

7. The combustor of claim 1, wherein the high reactivity gaseous fuel comprises syngas or hydrogen.

8. A method of operating a combustor with a low reactivity fuel and a high reactivity fuel, comprising:
directing a flow of the low reactivity fuel to a secondary nozzle;
directing a flow of the low reactivity fuel to a plurality of primary nozzles;
varying the flow of the low reactivity fuel using a primary splitter valve directed to the secondary nozzle and the plurality of primary nozzles;
directing a flow of the high reactivity fuel to the plurality of primary nozzles; and
varying the flow of the low reactivity fuel and the high reactivity fuel directed to the plurality of primary nozzles.

9. The method of claim 8, wherein a portion of the flow of the low reactivity fuel is directed to the secondary nozzle and a blend of the flow of the low reactivity fuel and the high reactivity fuel is directed to the plurality of primary nozzles in a primary mode.

10. The method of claim 9, wherein the primary mode comprises combustion in a primary combustion zone.

11. The method of claim 9, wherein the blend of the flow of the low reactivity fuel and the high reactivity fuel directed to the plurality of primary nozzles is reduced in a lean-lean mode.

12. The method of claim 11, wherein the lean-lean mode comprises combustion in a primary combustion zone and in a secondary combustion zone.

13. The method of claim 8, wherein the flow of the low reactivity fuel is directed to the secondary nozzle in a transfer mode.

14. The method of claim 13, wherein the transfer mode comprises combustion in a secondary combustion zone.

15. The method of claim 8, wherein a portion of the flow of low reactivity fuel is delivered to the secondary nozzle and a blend of the low reactivity fuel and the high reactivity fuel is directed to the plurality of primary nozzles in a premix mode and a blended mode.

16. The method of claim 15, wherein the premix mode and the blended mode comprise combustion in a secondary combustion zone.

17. The method of claim 8, wherein the steps of directing a flow of the low reactivity fuel comprise directing a flow of natural gas.

18. The method of claim 8, wherein the step of directing a flow of the high reactivity fuel comprises directing a flow of syngas or hydrogen.

19. A combustor, comprising:
a plurality of primary nozzles;
a plurality of primary combustion zones associated with the plurality of primary nozzles;
a secondary nozzle;
a secondary combustion zone associated with the secondary nozzle, the secondary combustion zone being disposed downstream of the plurality of primary combustion zones;
a first fuel source with a low reactivity gaseous fuel therein;
a secondary valve for varying the flow of the low reactivity gaseous fuel delivered to the plurality of primary nozzles and the secondary nozzle;
a second fuel source with a high reactivity gaseous fuel therein; and
a primary splitter valve that splitting the high reactivity gaseous fuel between the plurality of primary and secondary nozzles and for varying the flow of the low reactivity gaseous fuel and the high reactivity gaseous fuel delivered to the plurality of primary nozzles to form a combined flow of gaseous fuel having a reactivity tailored to the plurality of nozzles to prevent flashback/flame holding in the plurality of nozzles.

20. The combustor of claim 19, further comprising a control in communication with the primary valve and the secondary valve.

* * * * *